Patented June 23, 1925.

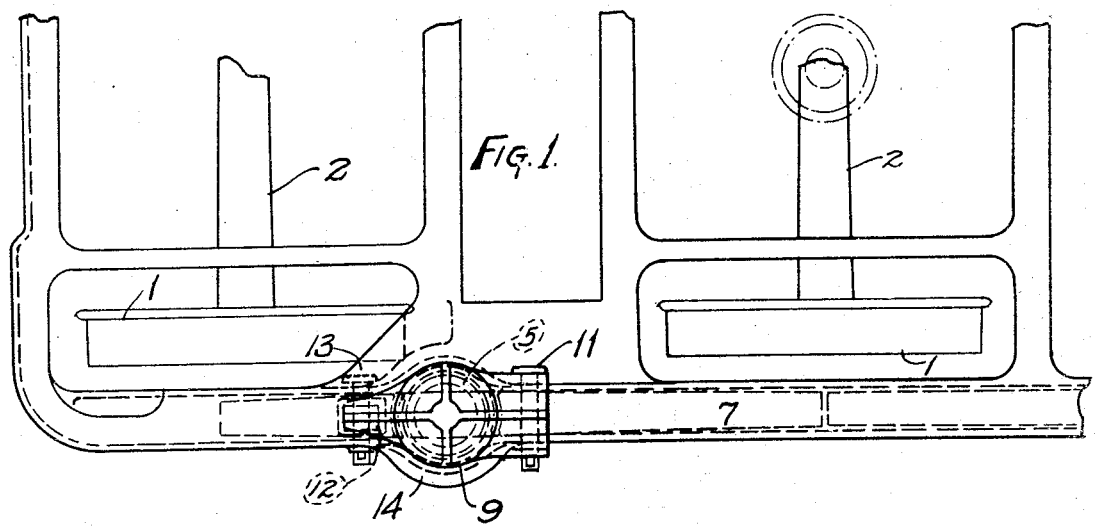
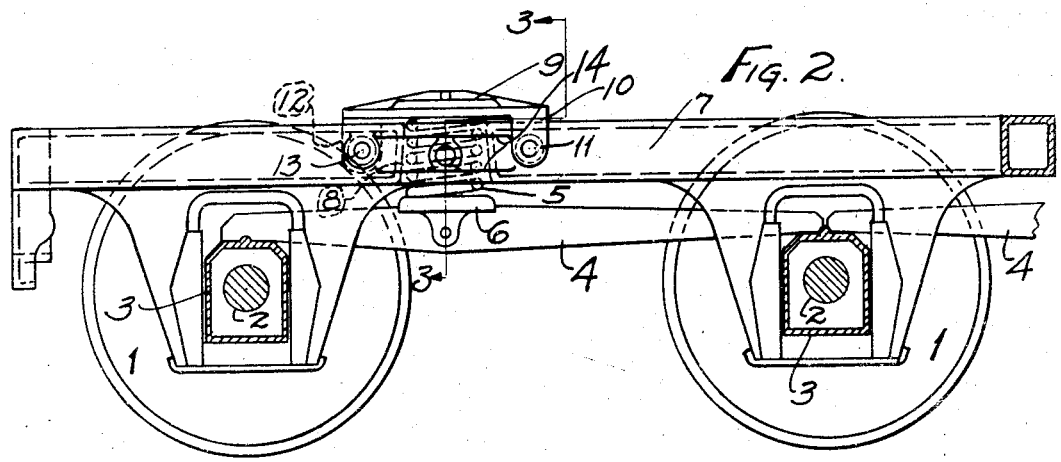
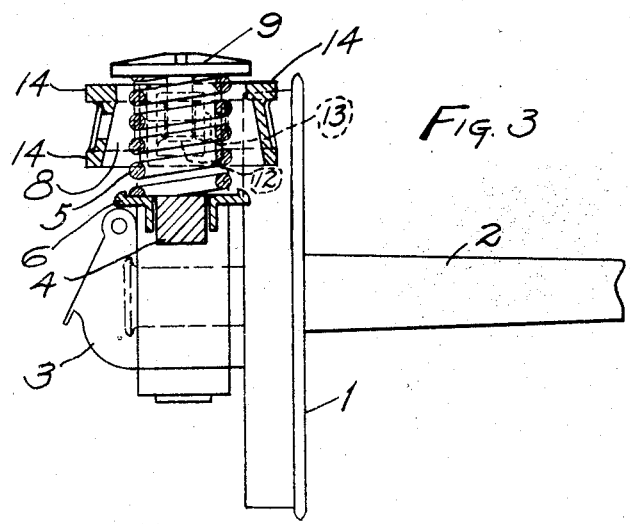

1,542,868

UNITED STATES PATENT OFFICE.

GEORGE H. GIBSON, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed January 26, 1924. Serial No. 688,650.

*To all whom it may concern:*

Be it known that I, GEORGE H. GIBSON, a citizen of the United States, residing at St. Louis, Missouri, have invented certain new and useful Improvements in Car Trucks, of which the following is a specification, such as will enable others skilled in the art to which it appertains to make and use the same.

My invention relates to railroad rolling stock and consists in an improved truck construction relating to the mounting of the truck frame upon the equalizer springs.

The object of my invention is to facilitate the application and removal of equalizer springs to the equalizer bars and wheel pieces. By means of my invention these operations are accomplished without removing the equalizers from the journal boxes and without other substantial disassemblage of the truck parts.

In the accompanying drawings which illustrate a selected embodiment of my invention—

Figure 1 is a top view of a portion of a six wheel truck equipped with my invention.

Figure 2 is a side elevation of the parts shown in Figure 1.

Figure 3 is a vertical transverse section taken approximately on the line 3—3 of Figure 2.

The truck illustrated is a six wheel truck two of the wheels being indicated at 1 mounted upon the axles 2 and journaled in boxes 3 in the usual manner. Equalizer bars 4 are mounted upon the journal boxes 3 and carry the truck frame through the equalizer springs 5. Each equalizer 4 is provided with a seat 6 for seating the corresponding spring 5 and the wheel pieces 7 of the truck frame are provided with openings 8 over each seat 6 for receiving a spring 5.

These openings extend through wheel pieces 7 and each is closed at its upper end by a cap 9 removably secured to the wheel piece 7. In my preferred construction cap 9 is shown as straddling the wheel piece 7 at one end with its depending legs 10 secured to the wheel piece by a horizontal pin 11. The opposite end of cap 9 is provided with a depending leg 12 positioned centrally of the wheel piece and secured thereto by a pin 13.

To accommodate spring 5 and to compensate for the metal removed from the wheel piece in providing opening 8 the wheel piece is provided with flanges 14 adjacent opening 8 and the vertical wall of the box-shaped wheel piece is curved outwardly at this point to form a substantially cylindrical housing for the spring.

With the above described or a similar construction, springs 5 may be removed and replaced by removing cap 9 and without disturbing the assembly of the remainder of the truck parts. To do this it is necessary to relieve pins 11 and 13 of the pressure in opposite directions of the wheel piece and cap legs and this may be done in several ways. For instance, a jack may be placed upon the top of the cap 9 and a chain wrapped around the outer end of the jack screw and the lower face of wheel piece 7. If the jack is then extended, cap 9 will be forced downwardly, compressing spring 5 so as to relieve pins 11 and 13. The chain may be wrapped around the bottom of wheel piece 7 and the top of the jack or over a suitable laterally extending bar or other tool placed upon the jack so as to provide a seat for the chain or chains spaced from the vertical axis of the jack.

Another method would be so support the truck frame on suitable blocks and insert a jack between the top of cap 9 and the bottom of the car body or the car body, with the truck frame blocked up, could be raised and blocks applied between cap 9 and the car body and the body then lowered until cap 9 was moved to free pins 11 and 13. Other methods of securing the same result will suggest themselves to workmen familiar with car repairing.

Obviously the form of the wheel piece may be varied from the box section shown in the accompanying drawings and the shape and application of the spring cap 9 may be modified without departing from the spirit of my invention as expressed in the appended claims.

I claim:

1. In a car truck frame, a wheel piece of substantially constant cross sectional area and provided with a vertical spring receiving opening, and a spring seat detachably secured to said wheel piece over said opening.

2. In a car truck frame, a wheel piece of hollow rectangular cross section, lateral enlargements in said wheel piece with a vertically aligned opening between them for receiving a supporting spring, and a spring seat extending over said opening and secured to said wheel piece at either end of said enlargements.

3. In a car truck frame, a wheel piece, including side walls and a top wall having a spring receiving opening, reinforcing flanges on said wheel piece adjacent said opening, a spring seat over said opening, depending legs on said seat detachably secured to said wheel piece at opposite sides of said opening, and reinforcing ribs extending from the center of said seat toward its edges.

4. In a car truck, a wheel piece provided with a vertical opening, and a cap extending over said opening and provided with depending legs straddling said wheel piece and secured thereto by horizontal pins.

5. In a car truck, a wheel piece provided with a vertical opening, and a cap extending over said opening, straddling said wheel piece at one end, inserted in said wheel piece at its opposite end, and secured at both ends by horizontal pins.

6. In a car truck, wheeled axles, journal boxes, an equalizer supported on said boxes, a spring cap seated on said equalizer and straddling the same, a spring seated on said cap, a frame wheel piece carried on said spring, and means whereby said spring may be removed through said wheel piece.

7. In a car truck, wheeled axles, journal boxes, a solid equalizer of substantially constant width supported on said boxes, a spring mounted on the top of said equalizer, a frame wheel piece carried on said spring, and means whereby said spring may be removed independently of movement of said equalizer and wheel piece.

8. In a car truck, an equalizer spring, a frame wheel piece provided with a vertical opening over said spring and having horizontal flanges adjacent said opening to maintain the sectional area of the wheel piece, and a removable seat for said spring secured to said wheel piece at each end of said flanges and extending over said opening.

In testimony whereof I hereunto affix my signature this 22 day of January, 1924.

GEORGE H. GIBSON.